July 2, 1968   M. L. FROBERG   3,390,972
METHOD FOR PROCESSING HEAT-SOFTENED MINERAL MATERIAL
Filed Feb. 23, 1965
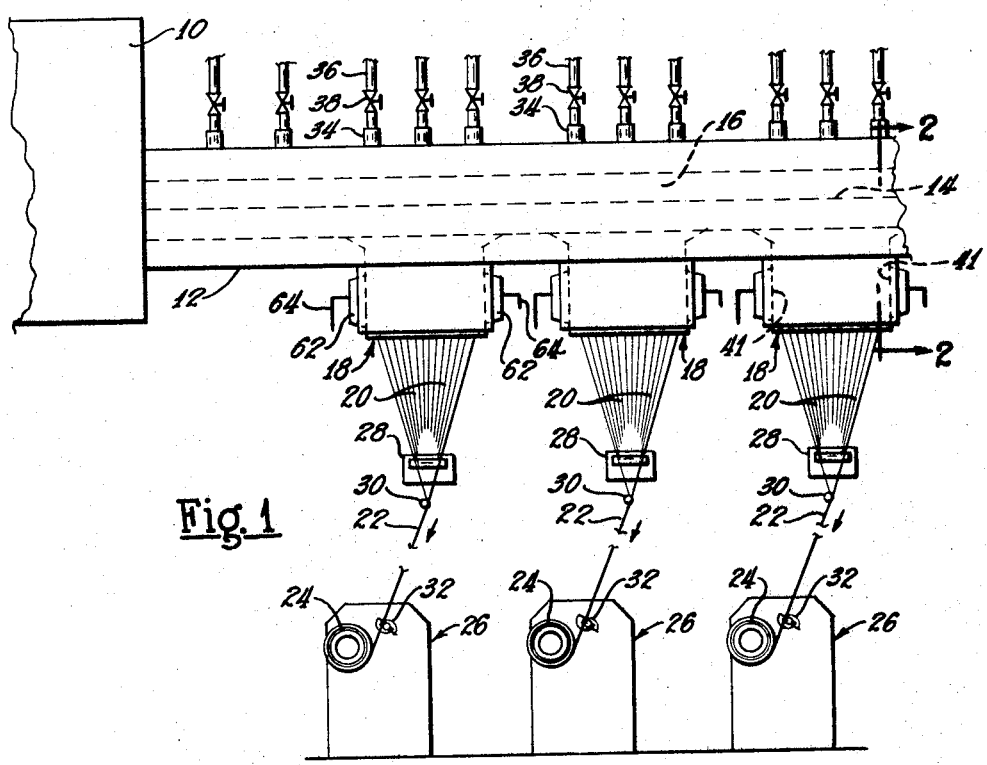
Fig. 1
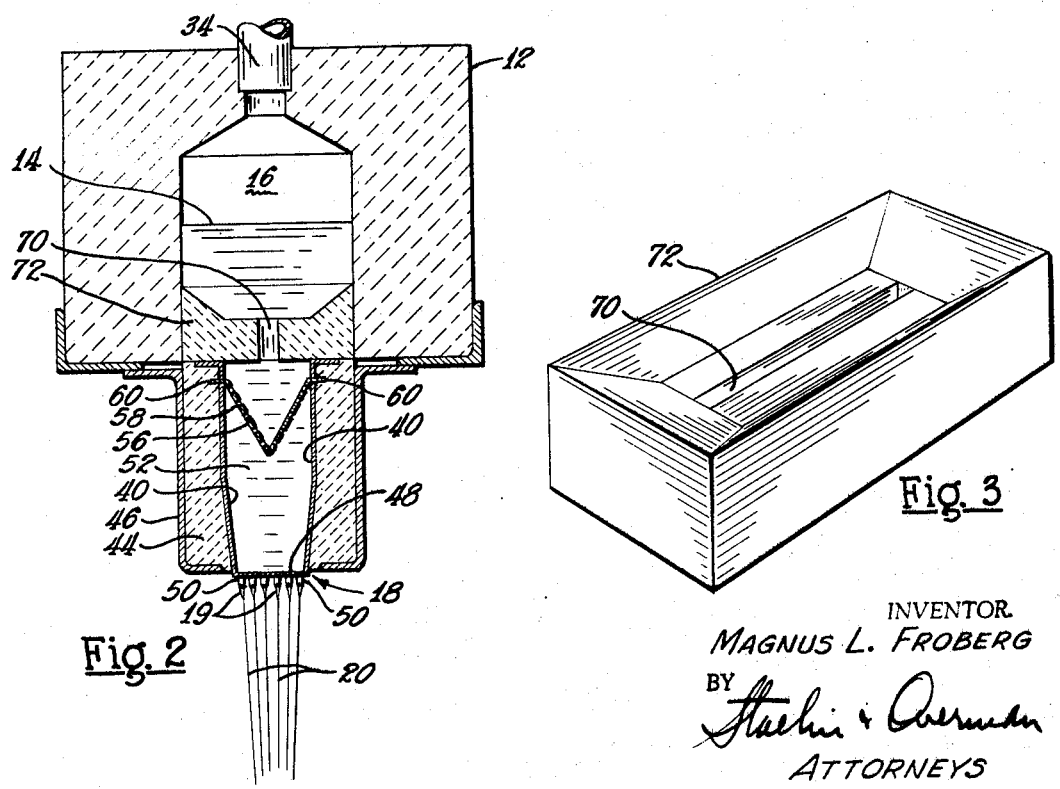
Fig. 2
Fig. 3
INVENTOR.
MAGNUS L. FROBERG
BY
ATTORNEYS 3,390,972
METHOD FOR PROCESSING HEAT-SOFTENED MINERAL MATERIAL
Magnus L. Froberg, Newark, Ohio, assignor to Owens-Corning Fiberglas Corporation, a corporation of Delaware
Filed Feb. 23, 1965, Ser. No. 434,524
3 Claims. (Cl. 65—1)

ABSTRACT OF THE DISCLOSURE

The invention disclosed embraces a method of and flow block arrangement for thermally isolating a bushing or several bushings disposed along a forehearth to impede transmission of radiant energy from glass in the forehearth to a bushing or bushings, and from the glass in the bushing or bushings to the forehearth to stabilize the operating characteristics of a bushing and reduce or minimize thermal interference or interaction between adjacent bushings.

---

This invention relates to a method of and apparatus for processing heat-softened material, such as glass, and more especially to a method and arrangement of feeding heat-softened glass to a plurality of stream feeders or bushings in a manner to thermally isolate each of the bushings to provide improved thermal control of the glass.

Recent developments have been made wherein glass batch is reduced to a molten state and refined in a furnace and the refined glass flowed through a forehearth channel directly into stream feeders or bushings disposed in spaced relation along the forehearth. Streams of the glass flow through orifices in the bushings and the streams attenuated to filaments or fibers by well known methods. This method of processing heat-softenable glass is usually referred to as a direct melt process. Heretofore in the direct melt process, the glass flows from a forehearth into each bushing through a substantially large rectangularly-shaped open area usually of substantially the same area as the cross sectional area of the bushing or stream feeder receiving the glass.

Difficulties have been encountered in endeavors to stabilize the thermal characteristics of the glass in the several bushings. In such method, variations in temperature of the glass in the forehearth are transferred to the bushings or stream feeders by reason of the large area of the open flow passage into each bushing, a condition referred to as "thermal cross-talk." Thus temperature upsets of the glass in the forehearth are transmitted to the bushings and thermal differences in the bushings are readily transferred to adjacent bushings through the glass in the forehearth channel. For example, if one bushing becomes inoperative or is taken out of service, the temperature of the glass in the forehearth is affected thereby. Radiant energy from the glass in one bushing interacts on other bushings. Each bushing is under the influence of radiant energy from the glass in the forehearth and temperature variations in the forehearth sets up thermal interference in the bushings. In the glass processing system of this character, variations in viscosity and other characteristics of the glass in several bushings results in nonuniform streams flowing from the bushings, and filaments or fibers attenuated from the streams are not nonuniform in size and have varying strength characteristics. Where the system is employed for producing fine filaments for textile uses, it is imperative that the filaments from the several bushings be of uniform size for the production of commercially acceptable textiles.

The present invention embraces a method of substantially thermally isolating each of several bushings or stream feeders disposed along a forehearth from energy radiation through the forehearth to reduce thermal interference or interaction between adjacent bushings to more nearly stabilize the operating characteristics of each bushing.

Another object of the invention resides in a method of effectively preventing the operating conditions of one bushing influencing the operating conditions of adjacent bushings by reducing transmission of radiant energy from one bushing to another.

Another object of the invention resides in a method of and apparatus for substantially reducing or impeding transfer of radiant energy from a bushing to a forehearth or from a forehearth to a bushing whereby each bushing may be operated substantially independently of adjacent bushings enabling the accurate control of bushing operating characteristics and temperatures of a group of bushings.

Another object of the invention resides in a method of and apparatus for reducing thermal interference among bushings associated with the same forehearth.

Another object of the invention resides in a structural arrangement for masking a bushing with respect to the forehearth to reduce or eliminate thermal interaction with the forehearth and adjacent bushings.

Another object of the invention resides in a method of effectively thermally isolating bushings from a forehearth whereby the transmission of radiant energy from reheated glass in the bushings to the glass in the forehearth is impeded to thereby avoid temperature upsets or variations in the glass in the forehearth.

Another object of the invention resides in the provision of a flow block construction for a stream feeder or bushing having a restricted flow passage to reduce or eliminate thermal interaction of the glass in the bushing with the glass in the forehearth.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a semi-schematic elevational view of a forehearth and bushing arrangement for carrying out the method of the invention;

FIGURE 2 is a vertical sectional view taken substantially on the line 2—2 of FIGURE 1 illustrating a structural arrangement of the invention; and FIGURE 3 is an isometric view of a flow block for a feeder bushing embodying the invention.

While the method and apparatus of the invention have particular utility in the processing of mineral materials, such as glass, for forming fibers or filaments from streams of glass, it is to be understood that the method of thermally isolating a bushing may be employed wherever it may be found to have utility.

Referring to the drawings in detail, FIGURE 1 is a semi-schematic elevational view illustrating a forehearth construction of a direct melt system for supplying heat-softened glass to a plurality of stream feeders or bushings associated with the forehearth. The glass batch is introduced into a melting and refining furnace or tank 10 at an end region of the furnace opposite the forehearth 12 which is connected with the melting and refining furnace. The glass batch is reduced to a flowable or molten condition in the furnace 10 and the molten glass is traversed through the furnace 10 to effect a refining of the glass whereby refined glass 14 is delivered from the furnace into the forehearth channel 16 lengthwise of the forehearth. The glass is processed to render it suitable for attenuation to filaments or fibers. Spaced lengthwise along the forehearth 12 are stream feeders or bushings 18.

The floor or tip section of each feeder or bushing is provided with orifice means through which flow streams of glass attenuated to filaments 20 by winding a strand 22 of the filaments upon a rotating collector 24 of a winding machine 26 of conventional construction, there being a winding apparatus for the filaments derived from each feeder.

The streams may be attenuated to fibers or filaments by other attenuating methods. An applicator 28 may be provided for each group of filaments for delivering binder or coating material onto each group of filaments. The filaments of each group are converged into a strand by a gathering shoe 30.

During winding of the strand 22 on a collector 24, a rotatable and reciprocable traverse means 32 engages the strand for distributing the strand lengthwise on the collector 24 to form a package. During winding, the rotation of the traverse 32 oscillates the strand 22 to cause the individual wraps or convolutions of strand to be collected on the collector in crossing relation in a conventional manner.

The glass in the forehearth is maintained in flowable condition by applying heat by means of burners 34 disposed in the roof of the forehearth 12, the burners being supplied with fuel gas and air mixture through tubular means 36 connected with a mixture supply, a valve means 38 being associated with each burner construction for regulating the delivery of fuel and air mixture to the burner. The burners are preferably of the radiant type but may be of any suitable character for establishing heat in the forehearth channel 16 to control the temperature of the glass 14 in the forehearth channel.

As illustrated in FIGURE 2, each bushing 18 is inclusive of substantially vertical side walls 40 and end walls 41 fashioned of an alloy of platinum and rhodium or other suitable metallic material capable of withstanding the high temperatures of molten glass and of corrosion resistant characteristics.

Each bushing is embraced by refractory insulation 44 supported by a metal casing 46 secured to the forehearth construction 12 in any suitable manner. The floor or tip section 48 of the feeder is fashioned with a group of depending projections or tips 50 each tip being tubular providing an orifice through which flows a stream 19 of glass.

The chamber 52 defined by the side walls 40 and end walls 41 of the feeder is preferably of greater depth than its width. The bushing illustrated in the drawings provides a comparatively deep narrow well in which the glass may be given a thermal treatment. Extending lengthwise in the upper region of the chamber 52 in the stream feeder or bushing is a heater member 56 preferably in the form of a screen or strip having perforations 58 to accommodate glass flow therethrough.

While the heater member 56 is illustrated of V-shaped configuration, it is to be understood that other configurations of heater strip may be used if desired. The heater member 56 has at its upper region flanges 60 joined with the side walls 40 of the bushing. Each end wall 41 of a bushing is fashioned with an integral terminal or terminal lug 62 preferably of uniform thickness throughout its height. Current is supplied to each terminal through a bus bar 64 connected with a current supply of comparatively high amperage and low voltage.

Each bus bar 64 is preferably connected with the adjacent terminal 62 by adjustable means (not shown) to adjust the region of connection of the bus bar with the terminal to control current distribution through the walls of the bushing and the heater strip 56. The glass in each bushing is preferably elevated in temperature by current flow through the heater member or strip 56 to thermally treat the glass in a bushing. The glass in the bushing may be increased above the temperature of the glass in the forehearth but the temperature of the glass in the bushing should not exceed the maximum temperature of the melt in the furnace 10 as "reboiling" will occur.

In prior installations wherein bushings receive glass from a forehearth, it has been conventional practice to flow the glass from the forehearth into a bushing through an opening in a flow block of approximately the same size and shape as the cross sectional area of the bushing. In the method and apparatus of the present invention, the glass passage 70 in the flow block 72 is narrow compared to the width of the bushing and the width of flow block passages heretofore used in conjunction with bushings.

The flow block 72 is fashioned of high temperature resistant refractory and the narrow glass passage 70 in the flow block is substantially the same length as the bushing and is arranged lengthwise of flow of the glass in the forehearth channel. With the comparatively narrow throat or glass passage through which glass from the forehearth channel flows into a bushing, the adjacent refractory of the block 72 serves to thermally isolate or mask the bushing from the forehearth.

By reason of the flow block 72 substantially covering the bushing except for the narrow passage 70 as shown in the drawings, radiant energy or heat from the glass of the bushing is substantially prevented from being transmitted from a bushing to the forehearth and thence to adjacent bushings.

Through this arrangement each bushing is thermally isolated whereby the characteristics of the glass in a bushing are substantially independent of the characteristics of the glass in the forehearth thereby enabling accurate control of the characteristics of the glass in each bushing independently of the others. In installations such as that shown in FIGURE 2 where the glass is subjected to thermal treatment by substantially increasing the temperature of the glass by electric energy passing through the heater strip, transmission of the radiant energy to the glass in the forehearth is substantially prevented by the flow block 72.

The glass flow passage 70 is of a width to provide for flow of glass into a bushing preferably slightly in excess of the rate of delivery of the glass by way of the streams through the orificed projections 50 so as to maintain the bushing filled with glass at all times. Through the provision of the restricted passage 70, the glass moving from the forehearth 12 through the narrow passage 70 into the bushing flows at a rate which assists in preventing transfer of heat from the bushnig into the glass in the forehearth.

The flow block 72 likewise functions to prevent transmission of temperature variations in the glass in the forehearth to a bushing. Thus, through the provision of the restricted flow channel 70, temperature upsets in the glass in the forehearth do not appreciably effect the characteristics of the glass in each of the operating bushings. If a bushing is taken out of service, variations in temperature of the glass in the forehearth do not appreciably affect the glass in the operating bushings.

As particularly shown in FIGURE 3 the passage in the flow block 72 is comparatively narrow and extends substantially full length of the bushing. The flow capacity of the passage 70 must be at least equal to and preferably slightly greater than the stream discharge capacity of the tip section of the bushing in order to maintain each bushing filled with glass to assure a substantially constant head of glass at the tip section of a bushing. For the average size bushing, a flow passage in a flow block of a width of approximately three-fourths of an inch is usually adequate to maintain the bushing filled with glass, the flow block portions defining the flow passage effectively masking the bushing to thermally isolate the same from the forehearth.

It is to be understood however, that for bushings having different glass discharge capacities, the flow passage 70 must be of sufficient width and length to accommodate flow of glass sufficient to satisfy the discharge volume of glass from the bushing.

While the restricted throat arrangement is illustrated in the drawings in association with a bushing of substantial depth and embodying heating means for increasing the temperature of the glass in the bushing, the flow block with a restricted flow passage may be utilized with relatively shallow bushings or bushings of other shapes provided with discharge orifices for delivery of streams of glass for any purpose.

The invention particularly improves the processing and conditioning of glass for forming fine continuous attenuated filaments as it enables the delivery of streams of more uniform size from the several bushings by reason of the high degree of thermal stability which can be maintained in each feeder or bushing without appreciable thermal interference from adjacent bushings or from the forehearth.

It is apparent that, within the scope of the invention, modifications and different arrangements may be made other than as herein disclosed, and the present disclosure is illustrative merely, the invention comprehending all variations thereof.

I claim:

1. The method of processing heat-softened fiber-forming mineral material including flowing the mineral material from a melting furnace along a forehearth channel for delivery into a stream feeder having orifices through which material flows from the feeder, thermally isolating the material in the feeder from the material in the channel, flowing the material from the feeder through the orifices as fine streams, and concomitantly flowing the material from the channel into the feeder through a restricted passage lengthwise of the glass flow in the channel and having a flow capacity substantially equal to but not less than the flow capacity of all of the orifices.

2. The method of processing heat-softened fiber-forming mineral material including flowing the mineral material from a melting furnace along a forehearth channel for delivery into a stream feeder having orifices through which material flows from the feeder, thermally isolating the material in the feeder from the material in the channel by a refractory body, flowing the material from the feeder through the orifices as fine streams, and concomitantly flowing the material from the channel into the feeder through a restricted passage in the refractory body lengthwise of the glass flow in the channel having a flow capacity substantially equal to but not less than the flow capacity of all of the orifices.

3. The method of processing heat-softened fiber-forming mineral material including flowing heat-softened mineral material along a forehearth channel for delivery from the channel into bushings arranged along the forehearth, thermally isolating each bushing from the channel, flowing streams of the material through orifices in the bushings, and flowing the material from the channel into each of the bushings through a narrow passage lengthwise of the bushing and of a cross sectional area admitting material into each bushing substantially equal to and not less than the amount of material flowing through the orifices in the bushings.

References Cited

UNITED STATES PATENTS

| | | | |
|---|---|---|---|
| 3,028,442 | 4/1962 | Glaser | 65—1 |
| 3,082,614 | 3/1963 | Denniston | 65—2 |
| 3,269,820 | 8/1966 | Day et al. | 65—136 |

DONALL H. SYLVESTER, *Primary Examiner.*

R. L. LINDSAY, Jr., *Assistant Examiner.*